United States Patent
Hayatnagarkar et al.

(10) Patent No.: US 12,020,051 B2
(45) Date of Patent: Jun. 25, 2024

(54) SHARABLE LINK FOR REMOTE COMPUTING RESOURCE ACCESS

(71) Applicant: Microsoft Technology Licensing, LLC, Redmond, WA (US)

(72) Inventors: Ankur Hayatnagarkar, Redmond, WA (US); Ashish Jain, Redmond, WA (US); Buyu Chen, Redmond, WA (US); Abhishek Agarwal, Redmond, WA (US); Sandeep Bansal, Redmond, WA (US); Mohit Garg, Redmond, WA (US); Aakash Valangaiman Radhakrishnan, Bellevue, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 502 days.

(21) Appl. No.: 16/745,984

(22) Filed: Jan. 17, 2020

(65) Prior Publication Data
US 2021/0224091 A1 Jul. 22, 2021

(51) Int. Cl.
*G06F 9/451* (2018.01)
*G06F 9/445* (2018.01)
(Continued)

(52) U.S. Cl.
CPC ...... *G06F 9/45558* (2013.01); *G06F 9/44505* (2013.01); *G06F 9/452* (2018.02);
(Continued)

(58) Field of Classification Search
CPC .... G06F 9/45558; G06F 9/452; G06F 16/955; G06F 9/44505; G06F 9/542; G06F 9/546;
(Continued)

(56) References Cited

U.S. PATENT DOCUMENTS

| | | | |
|---|---|---|---|
| 9,137,222 B2 * | 9/2015 | Haeger | H04L 63/0471 |
| 2005/0022183 A1 * | 1/2005 | Poisson | H04L 12/4641 |
| | | | 718/1 |

(Continued)

OTHER PUBLICATIONS

"International Search Report and Written Opinion Issued in PCT Application No. PCT/US2020/066502", dated Mar. 23, 2021, 15 Pages.

*Primary Examiner* — Emerson C Puente
*Assistant Examiner* — Jonathan R Labud
(74) *Attorney, Agent, or Firm* — Han Gim; Newport IP, LLC

(57) ABSTRACT

Techniques of remote computing resource access using sharable links are disclosed herein. One example technique includes receiving, at a security portal of a private network, an access request from a client device of a user for accessing a virtual machine ("VM") on the private network via a public network. The technique can then include retrieving a copy of a configuration file corresponding to the virtual machine according to the VM identifier in the access request and accessing the virtual machine according to operating parameters in the retrieved copy of the configuration file to generate an execution result. The technique can further include transmitting, from the security portal, the execution result to the client device of the user via the public network, thereby shielding, with the security portal, the virtual machine on the private network from actions initiated via the public network.

19 Claims, 6 Drawing Sheets

(51) Int. Cl.
*G06F 9/455* (2018.01)
*G06F 9/54* (2006.01)
*G06F 16/955* (2019.01)
*H04L 9/40* (2022.01)

(52) U.S. Cl.
CPC .............. *G06F 9/542* (2013.01); *G06F 9/546* (2013.01); *G06F 16/955* (2019.01); *H04L 63/0272* (2013.01); *H04L 63/083* (2013.01); *G06F 2009/45587* (2013.01); *G06F 2009/45595* (2013.01)

(58) Field of Classification Search
CPC . G06F 2009/45587; G06F 2009/45595; H04L 63/0272; H04L 63/083
See application file for complete search history.

(56) References Cited

U.S. PATENT DOCUMENTS

| | | |
|---|---|---|
| 2007/0260738 A1 | 11/2007 | Palekar et al. |
| 2011/0231840 A1 | 9/2011 | Burch et al. |
| 2014/0007189 A1* | 1/2014 | Huynh ................ G06F 9/45558 718/1 |
| 2016/0034295 A1* | 2/2016 | Cochran ............ G06F 9/45558 718/1 |
| 2018/0295134 A1* | 10/2018 | Gupta ..................... H04L 67/02 |
| 2020/0396088 A1* | 12/2020 | Master ................ H04W 12/043 |

* cited by examiner

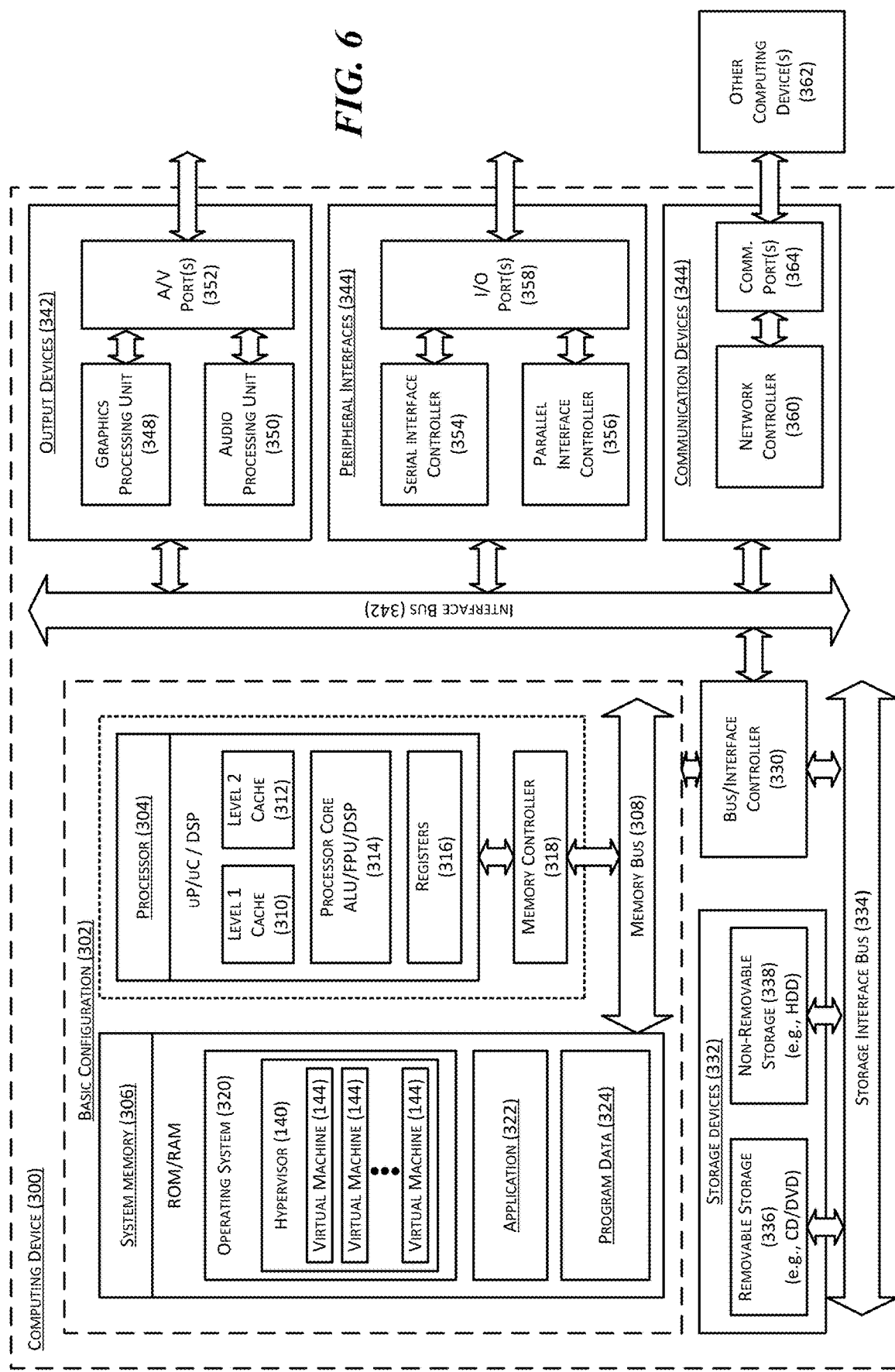

SHARABLE LINK FOR REMOTE COMPUTING RESOURCE ACCESS

BACKGROUND

Remote or "cloud" computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines ("VMs"), containers, virtual switches, load balancers, and other types of virtualized components for resource sharing. During operation, the virtual machines or containers can facilitate execution of user applications to provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, remote servers can provide computing services to multiple users or "tenants" via virtualization of compute, storage, network, or other suitable types of physical resources. For example, a server can execute suitable instructions on an operating system to provide a hypervisor for managing multiple virtual machines hosted at the server. Each virtual machine can serve the same or distinct users to execute corresponding applications and provide computing services. As such, multiple users can share physical resources at the individual servers in cloud computing facilities. On the other hand, a single user can also consume physical resources from multiple servers, storage devices, or other suitable components of cloud computing facilities.

To use the various physical resources in the cloud computing facilities, users or tenants typically request access via a public network, such as the Internet. To facilitate access via a public network, virtual machines can be identified by public Internet Protocol ("IP") addresses. The public IP addresses, however, can expose the virtual machines to various malicious actions, such as distributed denial of service ("DDoS") or attacks. To guard against such malicious actions, a security portal can be deployed between a private network (e.g., a virtual network in a datacenter) of a tenant interconnecting various virtual machines and the public network in cloud computing facilities. The security portal can be configured to identify, alert, and remedy malicious actions directed to the corresponding private network. As such, the various virtual machines and other computing resources on the private network can be shielded from being directly exposed to the public network. One example of such a security portal is Azure Bastion® provided by Microsoft Corporation of Redmond, Washington.

Deploying the security portal, however, can create certain difficulties for an administrator to share computing resources of the private network with additional users of the private network. For example, an administrator of the private network can have access to both the security portal and a virtual machine on the private network. In order to share the virtual machine of the private network with an additional user, the administrator may provide a copy of a configuration file (e.g., a Remote Desktop Protocol or "RDP" file) according to a remote access protocol with the user via, for instance, a physical storage drive. The user can then utilize a suitable remote access client, or another specialized application installed on a client device to access the shared virtual machine according to the received copy of the configuration file. An example of a remote access client is Microsoft Remote Desktop Client® provided by Microsoft Corporation of Redmond, Washington.

Sharing copies of the configuration file in such a manner, however, can have certain drawbacks. In one aspect, the shared configuration file may be maliciously modified during transit or after being installed on the user's client device such that login credentials or other sensitive information may be compromised. In another aspect, maintaining various copies of the shared configuration file can be inefficient and labor intensive, especially when multiple copies are distributed to multiple users. For example, to update a configuration file to a large number of users, the administrator has to update all copies of the previously shared configuration file located on potentially a large number of client devices. In another example, to delete a previously shared configuration file, the administrator also has to delete all copies of the configuration file installed on the corresponding client devices. Such actions can be repetitive, labor intensive, and prone to error.

Several embodiments of the disclosed technology are directed to techniques that can facilitate management and distribution of various computing resources in a cloud computing facility via creation and distribution of a sharable link configured for accessing remote computing resources in the cloud computing facility. In certain embodiments, the sharable link can include a network address of a security portal and a VM identifier that identifies a virtual machine managed by the security portal. For example, the sharable link can contain a token, a hash value, a serial number, or other suitable types of identifier corresponding to the virtual machine. The sharable link may include no other information that can be used to address the virtual machine via a public network, such as a public/private network address, a Media Access Control ("MAC") address, etc. Thus, one may not bypass the security portal to directly access the virtual machine on the private network via a public network. As such, malicious actions directed toward the virtual machine may be prevented. In other embodiments, the sharable link can also include a subscription identification, a resource group identification, a resource provider identification, a security portal host identification, and/or other suitable information that is not network addressable via a public network.

In operation, the administrator who has access to both the security portal and the virtual machine can submit a request for a sharable link to the virtual machine to a cloud resource manager (e.g., a fabric controller) in the cloud computing facility. In response, the cloud resource manager can be configured to generate and transmit a sharable link to the administrator upon verification of credentials. The administrator can then distribute the sharable link to additional users of the private network by sharing a webpage (e.g., an intranet webpage) having the sharable link embedded on the webpage, attaching the sharable link to an email or other suitable electronic messages, or via other suitable distribution mechanisms.

Upon receiving the sharable link, the user can actuate the sharable link on a client device by, for instance, click on the sharable link embedded in the shared webpage. Upon detecting the actuation, the client device can generate an access request to the virtual machine and transmit the access request to the security portal along with the VM identifier via a public network. Upon receiving the access request, the security portal can identify the virtual machine according to the included VM identifier, retrieve a copy of a configuration file corresponding to the virtual machine (e.g., an RDP file) from a network storage, and facilitate credential validation of the user with the identified virtual machine. For example, the security portal can be configured to facilitate providing a login screen on a webpage to the user, receiving and relaying user credential to the virtual machine, and providing authentication results to the user.

Upon successful validation of the user, the security portal can be configured to relay operation requests and execution results between the client device of the user and the identified virtual machine. For example, the security portal can relay an operation request from the client device to execute a user application to the virtual machine. In turn, the security portal can be configured to relay an execution result from the virtual machine to the client device as, for instance, an image embedded in a webpage or in other suitable messages. In other examples, the security portal can relay the execution result in other suitable manners.

Several embodiments of the disclosed technology can thus allow efficient management and distribution of sharable links to computing resources in a cloud computing facility without compromising security of the shared computing resources. In one aspect, the shared link can be composed to exclude any network address or other addressable information of the virtual machine via a public network. As such, risks of malicious actions directed at the virtual machine via a public network may be reduced or even prevented. In another aspect, the administrator can efficiently manage and maintain the configuration file of the corresponding virtual machine. For example, when an update to the configuration file is available, only the copy of the configuration file located in the network storage may require modification. As such, updating multiple copies of the configuration file on various client devices can be avoided. In another example, access to the virtual machine can be terminated by removing just the copy of the configuration file in the network storage instead of deleting all previously shared copies of the configuration file from multiple client devices. As such, efficient management of shared computing resources can be achieved in the cloud computing facility without compromising security of the shared computing resources.

BRIEF DESCRIPTION OF THE DRAWINGS

FIG. 6 is a computing device suitable for certain components of the distributed computing system in FIG. 1.

DETAILED DESCRIPTION

Figure 1:
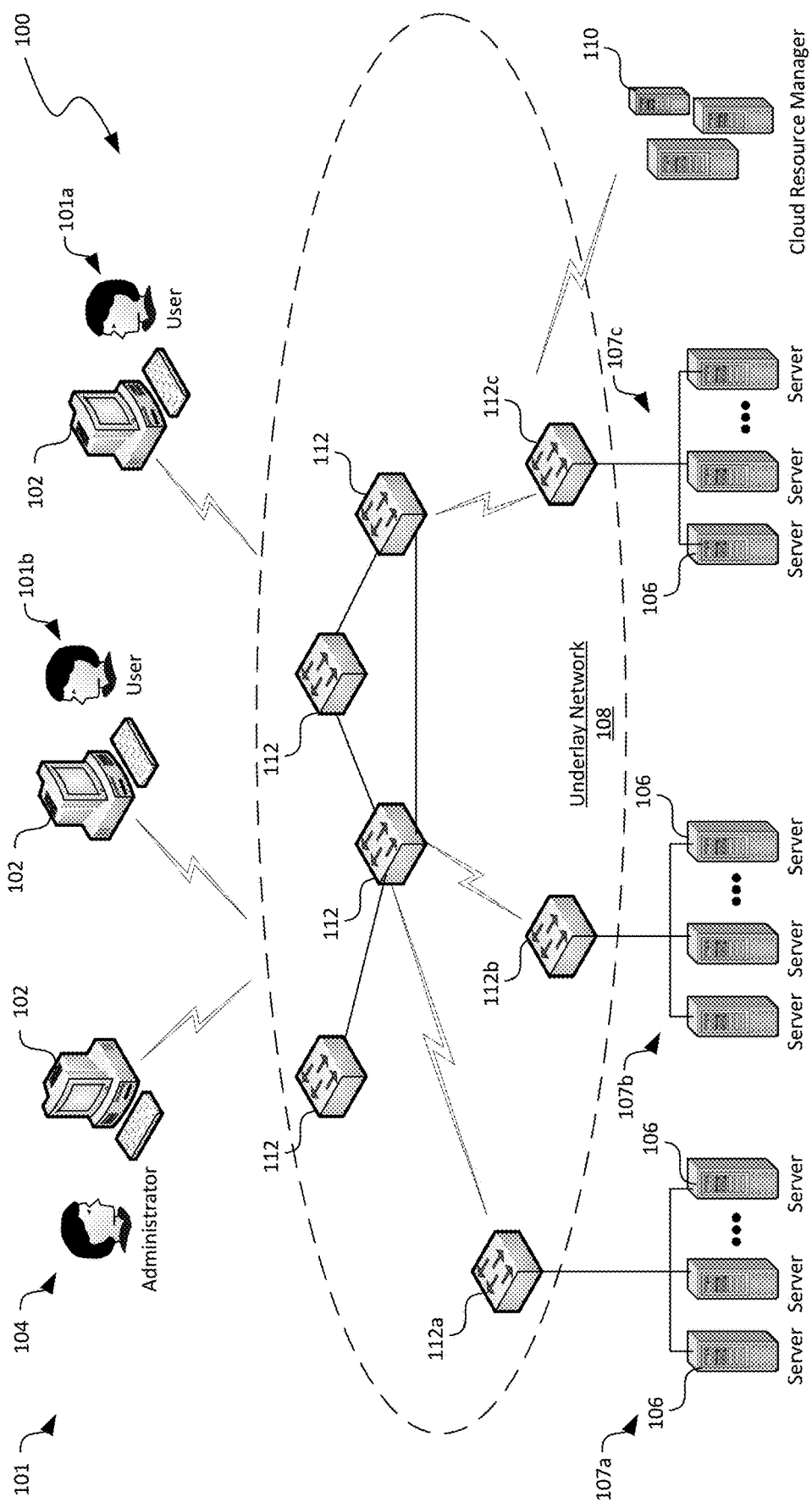
FIG. 1 is a schematic diagram illustrating a distributed computing system implementing sharable link for remote computing resource access in accordance with embodiments of the disclosed technology.

Certain embodiments of systems, devices, components, modules, routines, data structures, and processes for implementing sharable link for remote computing resource access in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term a "distributed computing system" generally refers to a computing facility having a computer network interconnecting a plurality of host machines to one another or to external networks (e.g., the Internet). An example of such a computing facility can include a datacenter for providing cloud computing services. A compute network can include a plurality of network devices. The term "network device" generally refers to a physical network device, examples of which include routers, switches, hubs, bridges, load balancers, security gateways, or firewalls. A "host" can be a server or other suitable types of hardware/software computing device that is configured to provide a hypervisor that supports one or more virtual machines, virtual switches, or other suitable types of virtual components.

As used herein, a "hypervisor" generally refers to computer software, firmware, and/or hardware that creates, manages, and runs one or more virtual machines on a host machine. A "virtual machine" or "VM" is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

Also used herein, the term "computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, a "security portal" generally refers to computing hardware and/or software configured to detect, alert, remedy, or otherwise provide security for a corresponding computer network. For example, a security portal can include credential validation, access control (e.g., a firewall), and/or other suitable authentication components. In other examples, a security portal can also include a DDoS detector, a virus scanner, a spam scanner, and/or other suitable detectors. One example of such a security portal is Azure Bastion® provided by Microsoft Corporation of Redmond, Washington.

Further used herein, a "link" or "weblink" generally refers to a reference to data that a user can follow by actuating the link via, for instance, clicking with a mouse or tapping with a finger or stylus. A link can point to a document (e.g., a webpage) or to a specific element within a document. An example link can be a hypertext link composed according to the Hypertext Markup Language ("HTML") standard. For instance, the following is an example hyperlink to the World Wide Web Consortium:
<a href="http://www.w3.org">W3C organization website</a>

In other examples, a link can also include data composed according to XLink or other suitable linking techniques. A "sharable link" is a link that can be shared between users. In one example, a link can be embedded in a webpage that can be accessed or otherwise provided to additional users. In other examples, a link can be embedded in other suitable types of document or message that supports JavaScript Object Notation ("JSON") or other suitable data exchange languages.

In cloud computing facilities, a security portal can be deployed to shield a private network and associated virtual machines or other suitable computing components from malicious actions from a public network. Deploying the security portal, however, can create certain difficulties for an administrator to share computing resources of the private network with additional users of the private network. For example, in order to share a virtual machine of the private network with an additional user, the administrator may provide a copy of a configuration file (e.g., a Remote Desktop Protocol or "RDP" file) with the user. The user can then utilize a suitable RDP client, or another specialized application installed on a client device to access the shared virtual machine according to the received RDP file.

Sharing copies of the RDP file in such a manner, however, can have certain drawbacks. For example, the shared RDP file may be maliciously modified during transit or after being installed on the user's client device such that user login credentials or other sensitive information may be compromised. Maintaining various copies of the shared RDP file can also be inefficient and labor intensive, especially when multiple copies are distributed to multiple users. For example, to update a previously shared copies of an RDP file to a large number of users, the administrator has to update all copies of the previously shared RDP file located on a large number of client devices. Such actions can be repetitive, labor intensive, and prone to error.

Several embodiments of the disclosed technology are directed to techniques that can facilitate management and distribution of various computing resources in a cloud computing facility via creation and distribution of a sharable link configured for accessing remote computing resources in the cloud computing facility. In operation, an administrator can submit a request for a sharable link to the virtual machine on a private network to a cloud resource manager in the cloud computing facility. In response, the cloud resource manager can be configured to generate and transmit a sharable link to the virtual machine to the administrator upon verification of credentials. The sharable link can include a network address of the security portal and a VM identifier of the shared virtual machine. The administrator can then distribute the sharable link to additional users of the private network by sharing a webpage (e.g., an intranet webpage) having the sharable link embedded on the webpage or via other suitable distribution mechanisms.

Upon receiving the sharable link, the user can actuate the sharable link on a client device by, for instance, by clicking on the sharable link embedded in the shared webpage. Upon detecting the actuation, the client device can generate an access request to the virtual machine and transmit the access request to the security portal using the network address of the security portal along with the VM identifier via a public network. Upon receiving the access request, the security portal can identify the virtual machine according to the included VM identifier, retrieve a copy of a configuration file of the virtual machine (e.g., an RDP file) from a network storage, and facilitate credential validation of the user with the identified virtual machine. Upon successful validation of the user, the security portal can be configured to relay operation requests and execution results between the client device of the user and the identified virtual machine. As such, efficient management and distribution of sharable links to computing resources in a cloud computing facility without compromising security of the shared computing resources, as described in more detail below with reference to FIGS. 1-6.

FIG. 1 is a schematic diagram illustrating a distributed computing system 100 having hosts implementing sharable link for remote computing resource access in accordance with embodiments of the disclosed technology. As shown in FIG. 1, the distributed computing system 100 can include a computer network (shown as an "underlay network 108") interconnecting a plurality of hosts shown as servers 106, a plurality of client devices 102 of users 101 and administrator 104, and a cloud resource manager 110 to one another. The cloud resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 or administrator 104 to access computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though two users 101 and one administrator 104 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
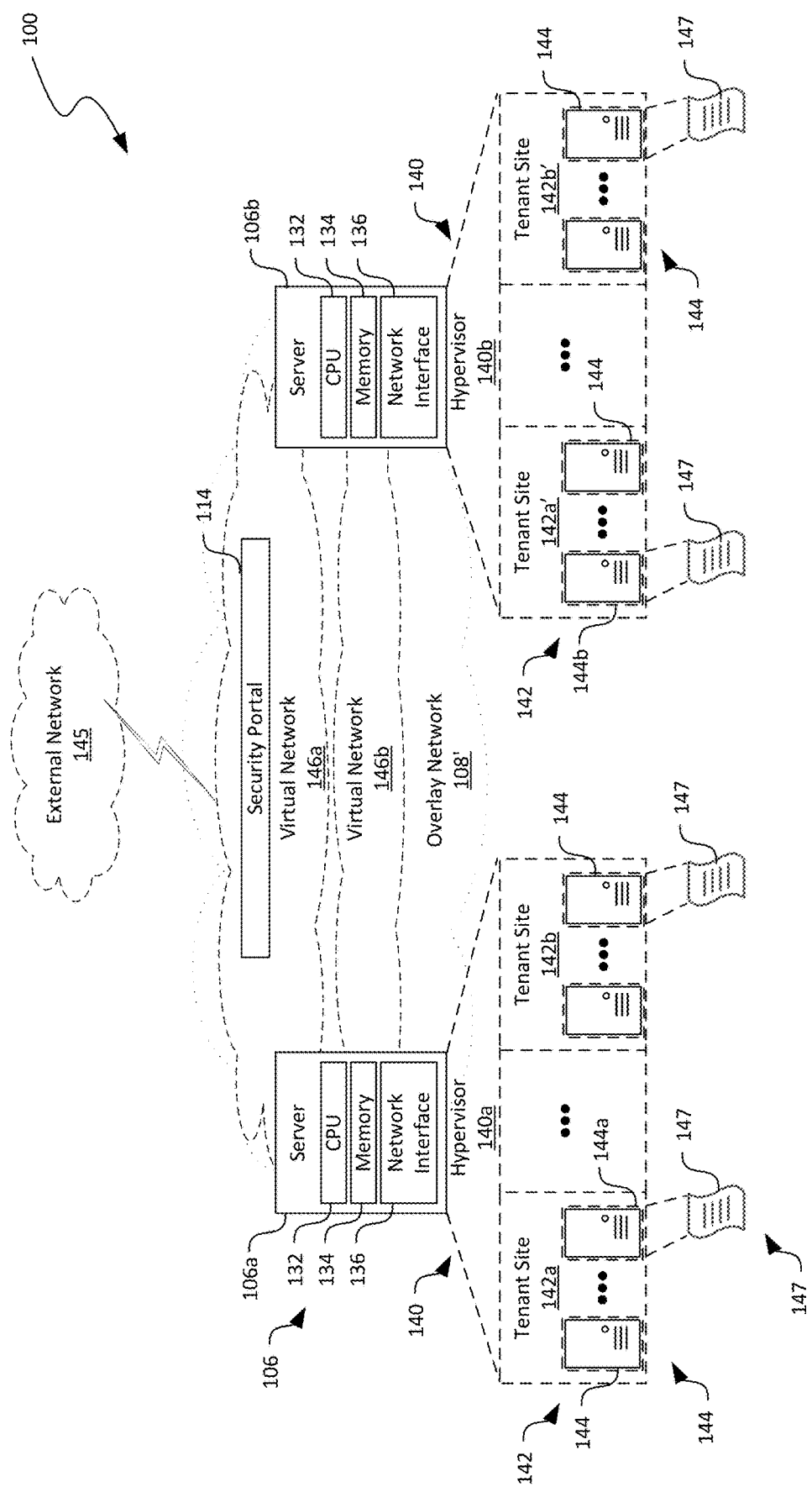
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a CPU 132, a memory 134, and a network interface 136 operatively coupled to one another. The CPU 132 can include one or more processors, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 132 (e.g., instructions for performing the methods discussed below with reference to FIGS. 5A and 5B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the CPU 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a (FIG. 1). The first server 106a and the second server 106b can both host the tenant site 142b and 142b' for a second user 101b (FIG. 1). Each virtual machine 144 can be executing applications or processes 147 corresponding to an operating system, middleware, and/or suitable applications. The executed applications or processes 147 can each correspond to one or more computing services or other suitable types of computing services.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

As shown in FIG. 2, one or more of the virtual networks 146 can deploy a security portal 114 configured to detect, alert, remedy, or otherwise provide security for the corresponding virtual networks 146. In the illustrated example, the first virtual network 146a includes a security portal 114. In other examples, the second or other suitable virtual networks 146 can also deploy a security portal in addition to or in lieu of that deployed in the first virtual network 146a. The security portal 114 can include various hardware/software components for providing security to various components on the virtual networks 146 (sometimes referred to as "private networks") from malicious actions initiated via an external network 145, such as the Internet (sometimes referred to as a "public network"). For example, the security portal 114 can include a DDoS detector, a firewall, and/or other suitable components. One example of such a security portal is Azure Bastion® provided by Microsoft Corporation of Redmond, Washington. The security portal 114 can also be configured to facilitate secure access to the virtual machines 144 on the corresponding virtual network 146, as described in more detail below with reference to FIGS. 3A-4B.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines and/or applications executing in the virtual machines 144. For example, the CPU 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

Figure 3A:
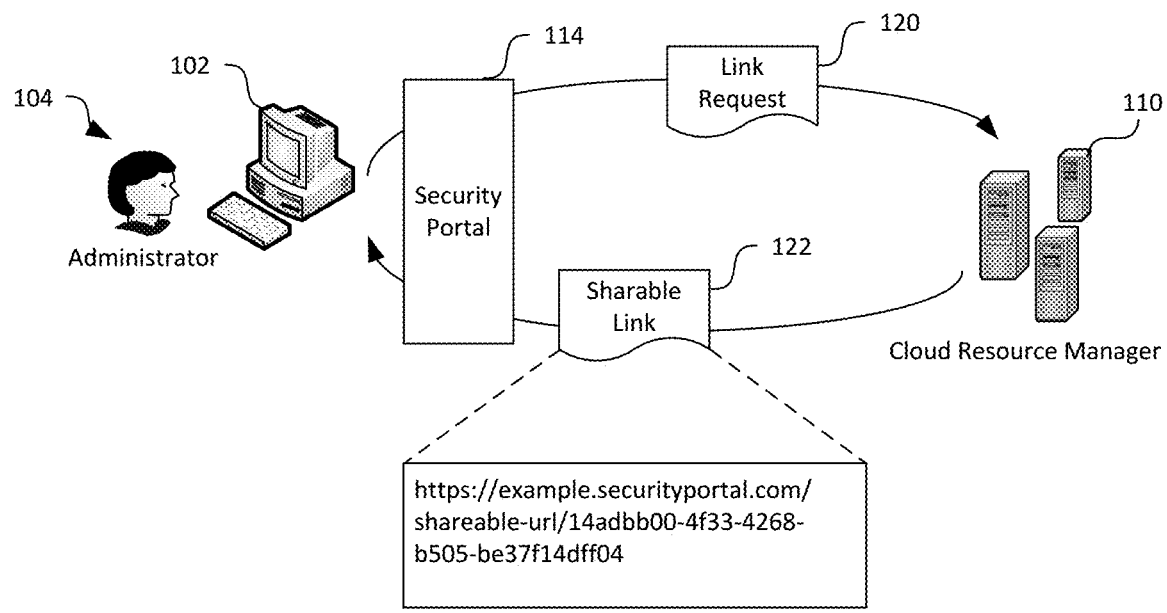
FIGS. 3A and 3B are schematic block diagrams of the distributed computing system during sharable link creation in accordance with embodiments of the present technology.
Figure 3B:
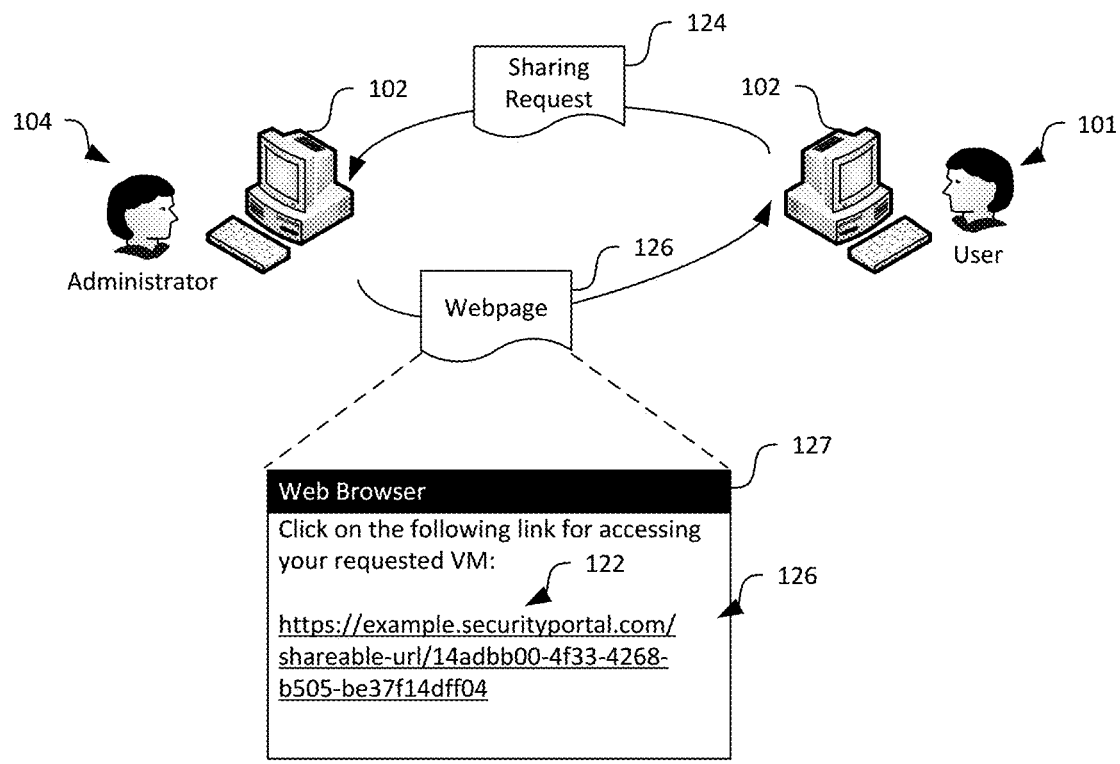

FIGS. 3A and 3B are schematic block diagrams of the distributed computing system 100 during sharable link creation in accordance with embodiments of the present technology. In FIGS. 3A and 3B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 3A, an administrator 104 of a virtual network 146 (FIG. 2) can using a client device 102 to submit a link request 120 for a sharable link 122 to a virtual machine 144 to a cloud resource manager 110 via the security portal 114. In response, the cloud resource manager 110 can collect information of the security portal 114 and the virtual machine 144, such as a subscription level, a model number, a network address, and/or other suitable information. The cloud resource manager 110 can then be configured to generate and transmit a sharable link 122 to the client device 102 of the administrator 104. In the illustrated example, the sharable link 122 can include a string that contains a network address of the security portal 114 (e.g., https://example.securityportal.com) and a VM identifier that is not addressable via a public network. For instance, the example VM identifier can include a sequence of alphanumerical characters, i.e., "shareable-url/14adbb00-4f33-4268-b505-be37f14dff04." In other examples, the VM identifier can also include a hash value, a serial number, or other suitable types of globally unique identifier. Upon receiving the sharable link 122, the administrator 104, the security portal 114, and/or other suitable entities can store a copy of the sharable link 122 in a network storage 118 (shown in FIG. 4A).

As shown in FIG. 3B, during operation, a user 101 associated with the virtual network 146 can transmit a sharing request 124 to the administrator 104. In certain examples, the sharing request 124 can include data identifying a virtual machine 144 the user 101 intends to access. In other examples, the sharing request 124 can simply identify a type, model, capacity, or other suitable parameters associated with a virtual machine 144 suitable for the user 101. In response, the administrator 104 can provide a webpage 126 containing the previously created sharable link 122 to the user 101. Upon receiving the webpage 126, the client device 102 of the user 101 can render and surface the webpage 126 in a web browser 127. In the illustrated example, the webpage 126 includes a simple description, i.e., "Click on the following link for accessing your requested VM:" and the sharable link 122, i.e., "https://example.securityportal.com/shareable-url/14adbb00-4f33-4268-b505-be37f14dff04." In other examples, the webpage 126 can include other suitable text, image, video, or other types of data in addition to or in lieu of the foregoing description.

Figure 4A:
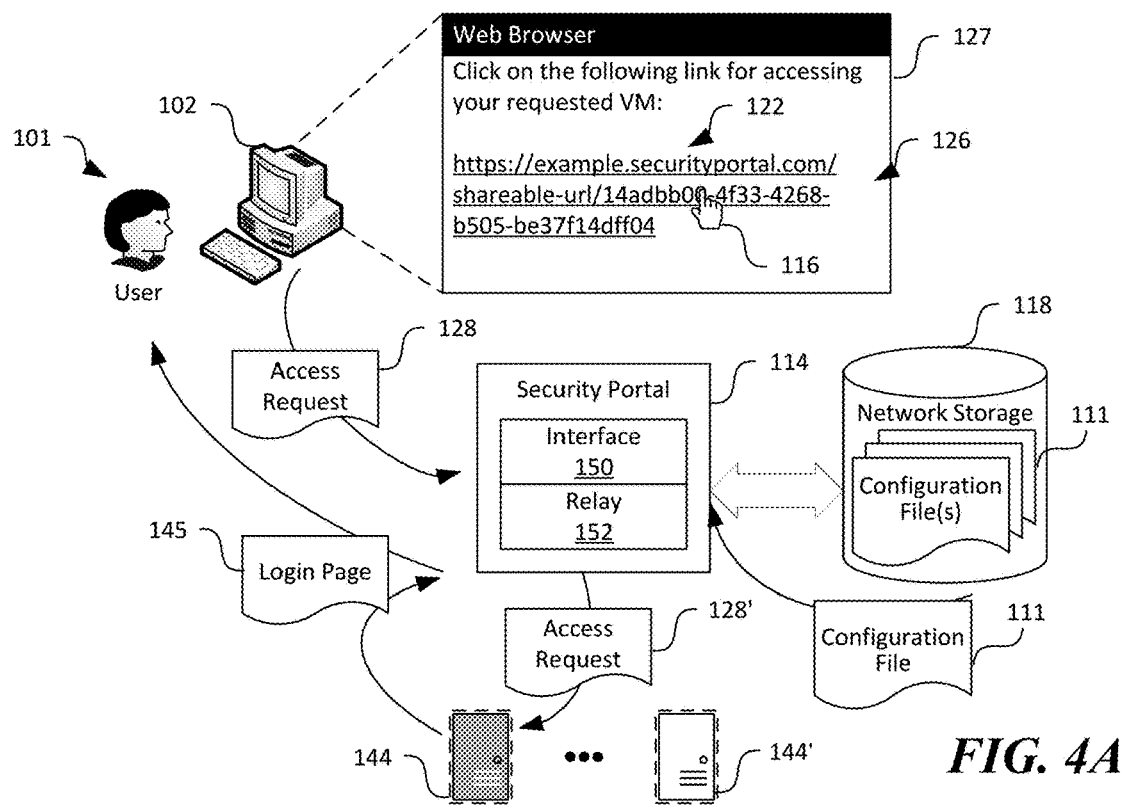
FIGS. 4A and 4B are schematic block diagrams of the distributed computing system during activation of a sharable link in accordance with embodiments of the present technology.
Figure 4B:
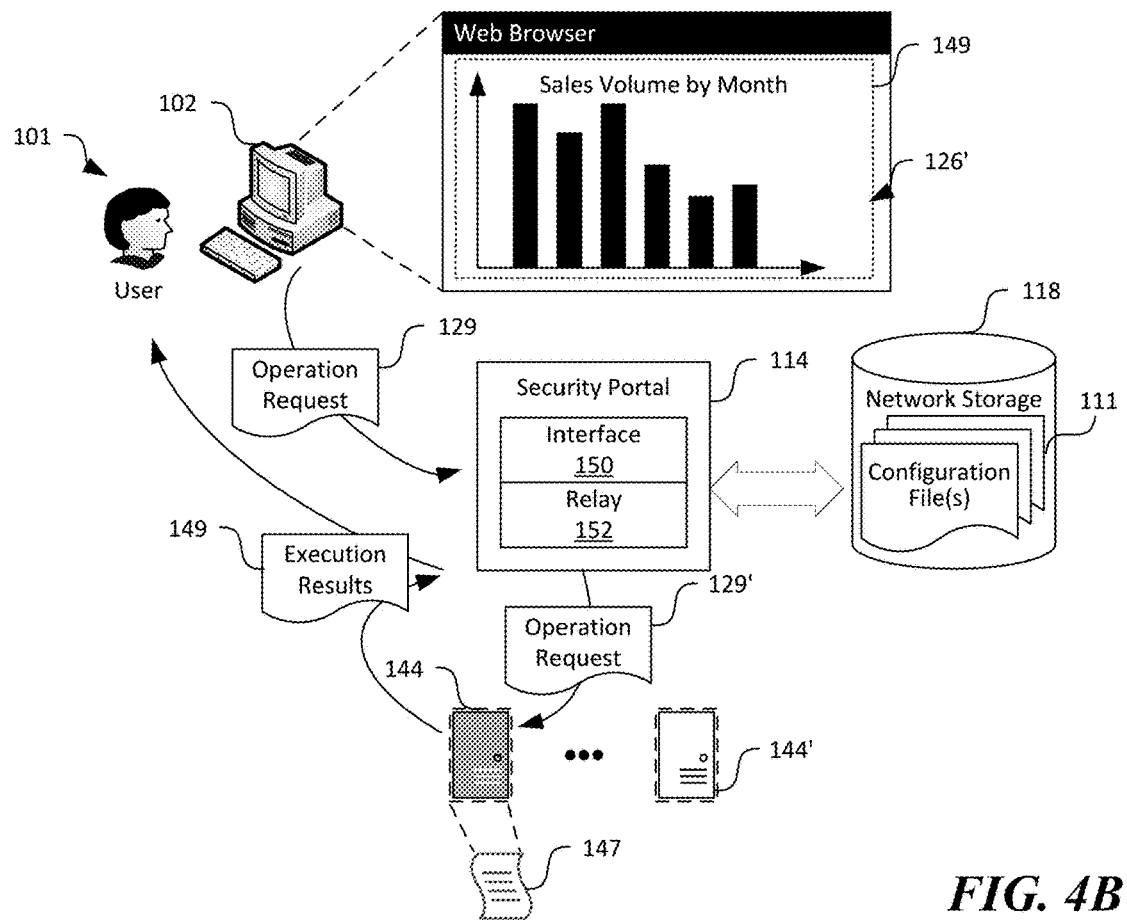

FIGS. 4A and 4B are schematic block diagrams of the distributed computing system 100 during activation of a sharable link 122 in accordance with embodiments of the present technology. As shown in FIG. 4A, the user 101 can actuate the sharable link 122 by providing an input, for instance, a click 116 on the sharable link 122. In response, the web browser 127 and/or other suitable components on the client device 102 can be configured to generate and transmit an access request 128 to the security portal 114. In certain implementations, the access request 128 can include one or more packets having suitable header values identifying the client device 102 as a source and the security portal 114 as a destination. The one or more packets can also carry a payload with data representing the VM identifier included in the sharable link 122. For example, the payload can include data representing "shareable-url/14adbb00-4f33-4268-b505-be37f14dff04," as shown in FIG. 4A. In other implementations, the access request 128 can be structured and/or configured in other suitable manners to include data representing the VM identifier.

As shown in FIG. 4A, the security portal 114 can include an interface component 150 and a relay component 152 operatively coupled to each other. Though only the foregoing components are shown in FIG. 4A, in certain embodiments, the security portable 114 can also include security, access control, and/or other suitable types of components. The interface component 150 can be configured to receive the access request 128 from the client device 102.

In response, the interface component 150 can extract the VM identifier from the access request 128 and identify a corresponding virtual machine 144 (shown in reverse contrast) based on the extracted VM identifier. The interface component 150 can then retrieve a configuration file 111 corresponding to the virtual machine 144 from the network storage 118. The retrieved configuration file 111 can include data representing one or more operating parameters configured according to a suitable remote access protocol for accessing the virtual machine 144. Upon retrieving the configuration file 111, the interface component 150 can forward the configuration file 111 to the relay component 152 for further processing.

The relay component 152 can be configured to establish a remote network connection with the virtual machine 144 using the one or more operating parameters in the configuration file 111 according to the suitable remote access protocol. As shown in FIG. 4A, the relay component 152 can then be configured to forward a copy of the access request 128' to the virtual machine 144 upon establishing the remote network connection. The relay component 152 can then be configured to relay operation requests 129 and execution results 149 (shown in FIG. 4B) between the client device 102 of the user 101 and the virtual machine 144. For example, as shown in FIG. 4A, the relay component 152 can be configured to relay a login page 145 from the virtual machine 144 to the client device 102.

As shown in FIG. 4B, the relay component 152 can be configured to relay an operation request 129 from the client device 102 to the virtual machine 144 and execution results 149 from the virtual machine 144 to the client device 102. For instance, in the illustrated example in FIG. 4B, the operation request 129 may include a request for execution of an application 147 in the virtual machine 144 to generate execution results 149 that include a bar chart illustrating sales volume by month. In other examples, the execution results 149 can include numbers, text, or other suitable types of information. In certain implementations, the execution results 149 can be provided to the client device 102 as images in additional webpages 126'. In other implementations, the execution results 149 can be provided to the client device 102 in other suitable formats.

Several embodiments of the disclosed technology can thus allow efficient management and distribution of sharable links 122 to computing resources in the distributed computing system 100 without compromising security of the shared computing resources. In one aspect, the shared link 122 can be composed to not include any private network address or other addressable information of the virtual machine 144 via a public network. As such, risks of malicious actions directed at the virtual machine via a public network may be reduced or even prevented. In another aspect, the administrator 104 can efficiently manage and maintain the configuration file 111 of the corresponding virtual machine 144. For example, when an update to the configuration file 111 is available, only the copy of the configuration file 111 located in the network storage 118 may require modification. Any subsequent access requests 128 for accessing the virtual machine 144 would be based on the updated configuration file 111. As such, updating multiple copies of the configuration file 111 on various client devices 102 of the users 101 can be avoided. In another example, access to the virtual machine 144 can be terminated by removing just one copy of the configuration file 111 in the network storage 118 instead of deleting all previously shared copies of the configuration file 111 from multiple client devices 102. As such, efficient management of shared computing resources can be achieved in the distributed computing system 100 without compromising security of the shared computing resources.

Figure 5A:
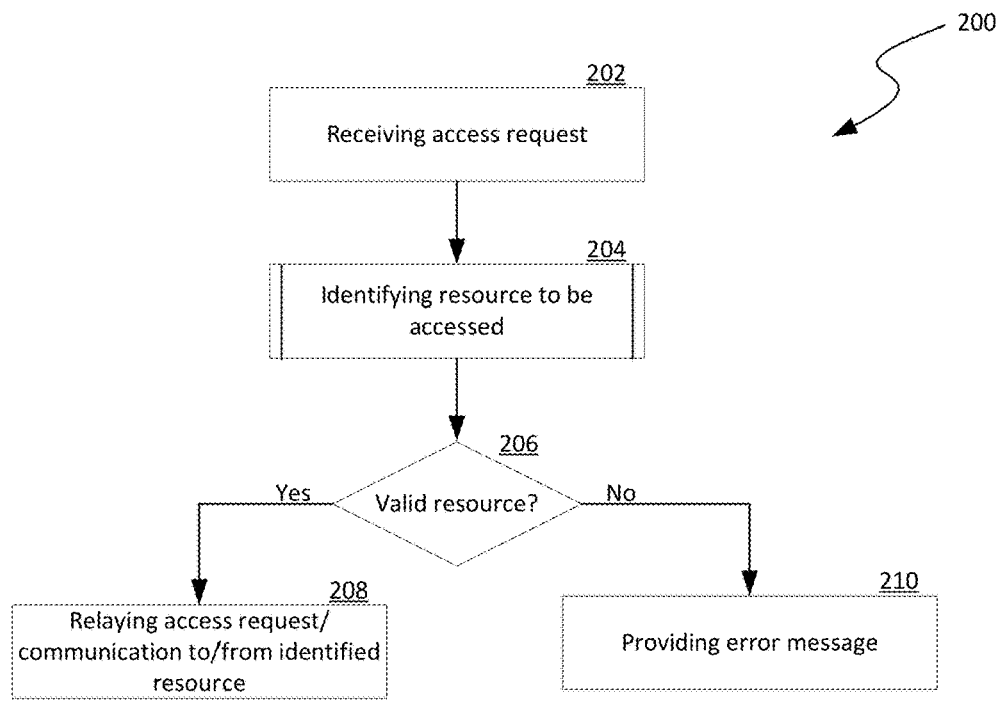
FIGS. 5A and 5B are flow diagrams illustrating aspects of processes for implementing sharable link for remote computing resource access in accordance with embodiments of the present technology.
Figure 5B:
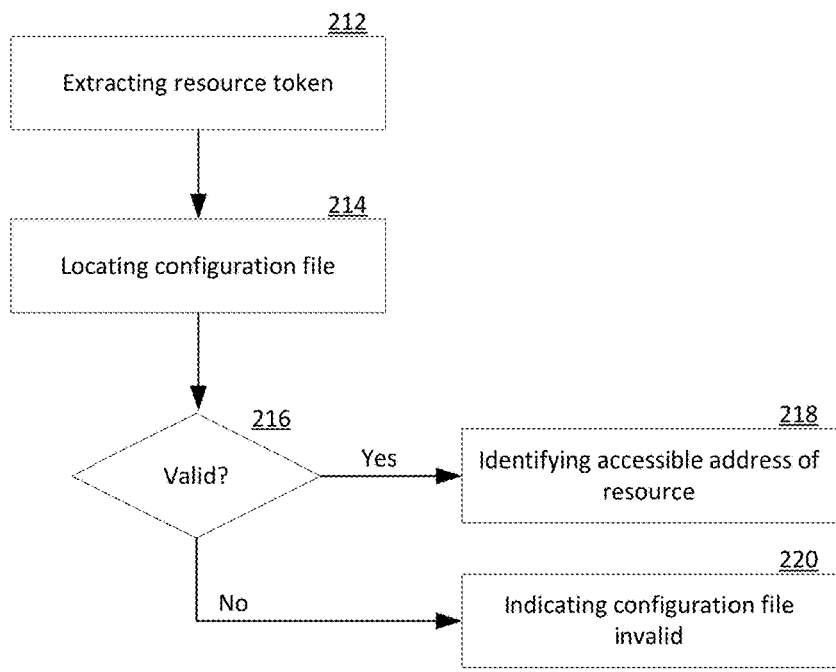

FIGS. 5A and 5B are flow diagrams illustrating aspects of processes for implementing sharable link for remote computing resource access in accordance with embodiments of the present technology. Even though various aspects of the processes are described below in the context of the distributed computing system 100 in FIGS. 1-4B, in other embodiments, various aspects of the processes can also be implemented in computing systems with additional and/or different components.

As shown in FIG. 5A, a process 200 can include an access request from a client device of a user at stage 202. In one example, the access request can contain a resource identifier (e.g., a VM identifier) and be formatted as an HTTP request. In other examples, the access request can contain the resource identifier and be formatted according to other suitable communication protocols. The process 200 can then include identifying a resource to be accessed at stage 204. For example, the resource can be identified by looking up a table or other suitable data structures to locate a resource corresponding to the resource identifier. Example operations for identifying the resource are described below in more detail with reference to FIG. 5B.

The process 200 can then include a decision stage 206 to determine whether the identified resource is valid. In some embodiments, a resource is valid when the resource (e.g., a virtual machine) is currently operating and/or available. In other embodiments, the resource can be valid when the resource can be instantiated or based on other suitable criteria. In response to determining that the resource is valid, the process 200 proceeds to relaying the access request or other suitable communication between the identified resource and the client device at stage 208. In response to determining that the resource is not valid, the process 200 proceeds to providing the client device an error message.

FIG. 5B illustrates example operations for identifying a resource to be accessed. As shown in FIG. 5B, the operations can include extracting a resource token (e.g., a VM identifier) from the access request at stage 212. In some examples, extracting the resource token can include identifying a portion of the access request in a preset format. In other examples, extracting the resource token can include identifying data at a tail, middle portion, or other suitable positions in the access request. The operations can then include locating a configuration file corresponding to the access request based on the extracted resource token at stage 214. The operations can then include a decision stage 216 to determine whether the configuration file is valid. In one example, a configuration file may include metadata indicating whether a time to live has expired. As such, validity of the configuration file can be determined based on such metadata. In another example, a configuration file may be absent from a network storage to indicate that the resource is no longer valid. In further examples, validity of the configuration file can be based on other suitable criteria. In response to determining that the configuration file is valid, the operations can proceed to identifying an accessible network address of the resource at stage 218. The network address can include an IP address or other suitable types of network address. In response to determining that the configuration file is not valid, the operations can proceed to indicating that the configuration file is invalid at stage 220.

FIG. 6 is a computing device 300 suitable for certain components of the distributed computing system 100 in FIG. 1, for example, the server 106, the client device 102, or the cloud resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A computing device in a distributed computing system having multiple servers configured to host one or more virtual machines ("VMs") interconnected by corresponding private networks, the computing device comprising:
   a processor; and
   a memory operatively coupled to the processor, the memory having instructions that, when executed by the processor, causes the computing device to:
   in response to receiving, via a public network, an access request from a client device to access a virtual machine of a private network deploying a security portal between the virtual machine and the public network,
   retrieve, via the security portal, a copy of a configuration file corresponding to the virtual machine using a VM identifier in the access request from a datastore accessible to the security portal, the configuration file containing data indicating one or more operating parameters used to access the virtual machine according to a remote access protocol, wherein the VM identifier is not addressable via the public network and is included in a shareable link used to generate the access request, the access request generated in response to activation of the shareable link;
   in response to retrieving the copy of the configuration file, access, via the security portal, the virtual machine on the private network based on the one or more operating parameters in the retrieved copy of the configuration file according to the remote access protocol to generate an execution result; and transmit, from the security portal, a link to a webpage to the client device via the public network, the webpage containing an image containing execution results of an application run by the virtual machine, thereby shielding, via the security portal, the virtual machine on the private network from actions initiated via the public network.

2. The computing device of claim 1 wherein the access request is generated by the client device in response to a user clicking on the webpage link, the webpage link shared by an administrator of the private network, the webpage link having a network address of the security portal and the VM identifier appended to the network address of the security portal.

3. The computing device of claim 1 wherein the memory includes additional instructions executable by the processor to cause the computing device to:

in response to receiving, at the security portal, data representing an update to the one or more operating parameters in the configuration file in the datastore, updating the one or more operating parameters in the configuration file in the datastore.

4. The computing device of claim 1 wherein:

the access request is a first access request; and the memory includes additional instructions executable by the processor to cause the computing device to:

in response to receiving, at the security portal, data representing an update to the one or more operating parameters in the configuration file in the datastore, updating the one or more operating parameters in the configuration file in the datastore; and in response to receiving a second access request for accessing the same virtual machine, retrieve another copy of the configuration file from the datastore and access, from the security portal, the virtual machine according to the updated one or more operating parameters in the retrieved another copy of the configuration file to generate another execution result.

5. The computing device of claim 1 wherein:

the access request is a first access request; and the memory includes additional instructions executable by the processor to cause the computing device to:

in response to receiving, at the security portal, an instruction to delete the configuration file in the datastore, deleting the configuration file from the datastore; and in response to receiving a second access request for accessing the same virtual machine, transmit, from the security portal, a message indicating that the requested virtual machine does not exist.

6. The computing device of claim 1 wherein:

to transmit the execution result includes to transmit a login webpage to the virtual machine to the client device via the public network; and the memory includes additional instructions executable by the processor to cause the computing device to relay operation requests and execution results between the client device and the virtual machine.

7. The computing device of claim 1, wherein the shareable link is a webpage link with the client device via an administrator of the private network.

8. A method of utilizing a shareable link to facilitate remote computing resource access in a distributed computing system, the method comprising:

receiving, at a security portal of a private network and via a public network, an access request from a client device of a user for accessing a virtual machine ("VM") on the private network, the access request including a VM identifier corresponding to the virtual machine, wherein the VM identifier and a network address of the security portal are included in a shareable link used to generate the access request, the access request generated in response to activation of the shareable link, wherein the VM identifier is not addressable via the public network; and in response to receiving the access request, retrieving, from a datastore accessible to the security portal, a copy of a configuration file corresponding to the virtual machine according to the VM identifier in the access request, the configuration file containing data indicating one or more operating parameters to access the virtual machine by the security portal; and upon retrieving the copy of the configuration file, accessing, from the security portal, the virtual machine according to the one or more operating parameters in the retrieved copy of the configuration file to generate an execution result; and transmitting, from the security portal, the execution result to the client device of the user via the public network, thereby shielding, with the security portal, the virtual machine on the private network from actions initiated via the public network.

9. The method of claim 8 wherein the shareable link includes a network address of the security portal and the VM identifier appended to the network address of the security portal.

10. The method of claim 8, further comprising:

receiving, at the security portal, data representing an update to the one or more operating parameters in the configuration file in the datastore; and in response to receiving the data representing the update to the configuration file, updating the one or more operating parameters in the configuration file in the datastore.

11. The method of claim 8 wherein:

the access request is a first access request; and the method further includes:

receiving, at the security portal, data representing an update to the one or more operating parameters in the configuration file in the datastore;

in response to receiving the data representing the update to the configuration file, updating the one or more operating parameters in the configuration file in the datastore; and in response to receiving a second access request for accessing the same virtual machine, retrieving another copy of the configuration file from the datastore and accessing, from the security portal, the virtual machine according to the updated one or more operating parameters in the retrieved another copy of the configuration file to generate another execution result.

12. The method of claim 8 wherein:

the access request is a first access request; and the method further includes:

receiving, at the security portal, an instruction to delete the configuration file in the datastore;

in response to receiving the instruction, deleting the configuration file from the datastore; and in response to receiving a second access request for accessing the same virtual machine, transmitting, from the security portal to the user, a message indicating that the requested virtual machine does not exist.

13. The method of claim 8 wherein:

transmitting the execution result includes transmitting a login webpage to the virtual machine to the client device of the user via the public network; and the method further includes relaying operation requests and execution results between the client device of the user and the virtual machine.

14. The method of claim 8 wherein transmitting the execution result includes transmitting a webpage to the client device of the user via the public network, the webpage containing an image containing execution results of an application by the virtual machine.

15. The method of claim 8, wherein the shareable link is a link shared with the client device via an administrator of the private network.

16. A method of utilizing a sharable link to facilitate remote computing resource access in a distributed computing system, the method comprising:

transmitting, from a client device of a user, a request for accessing a virtual machine ("VM") on a private network;

receiving, at the client device, a webpage containing a link in response to the transmitted request, wherein the link includes a string having:

a network address of a security portal of the private network, the security portal being accessible via a public network based on the network address, the network address including a Universal Resource Locator (URL) of the security portal; and a VM identifier corresponding to the virtual machine on the private network, the virtual machine being not accessible via the public network based on the VM identifier, the VM identifier including a globally unique identifier corresponding to the virtual machine; and in response to detecting an actuation of the link on the received webpage, generating and transmitting, from the client device via the public network, an access request for accessing the virtual machine to the security portal according to the network address, the access request including the VM identifier; and receiving, from the security portal via the public network, another webpage containing results of accessing the virtual machine, thereby allowing the client device to access the virtual machine without a copy of a configuration file configured according to a remote access protocol to directly access the virtual machine.

17. The method of claim 16 wherein:

receiving the another webpage includes receiving a login webpage to the virtual machine; and the method further includes transmitting login credentials to the security portal via the public network using the login webpage.

18. The method of claim 16 wherein receiving the another webpage includes receiving the another webpage containing an image containing execution results of an application by the virtual machine.

19. The method of claim 16, wherein the webpage is received at the client device via an administrator of the private network.

* * * * *